United States Patent [19]

Kommineni

[11] 4,370,513

[45] Jan. 25, 1983

[54] SEMI-FLEXIBLE GAS-INSULATED TRANSMISSION LINE USING PROTECTION TUBE IN CONDUCTOR PLUG-IN JOINT

[75] Inventor: Prasad R. Kommineni, Westboro, Mass.

[73] Assignee: Westinghouse Electric Corp., Pittsburgh, Pa.

[21] Appl. No.: 363,755

[22] Filed: Mar. 30, 1982

[51] Int. Cl.³ .................... H01B 9/06; H01B 9/04; H02G 5/06
[52] U.S. Cl. ...................... 174/21 JS; 174/21 C; 174/28; 339/64 R
[58] Field of Search .............. 174/16 B, 21 C, 21 CA, 174/21 JS, 21 JC, 21 JR, 22 C, 28, 84 S, 88 S, 94 S, 99 B, 99 E; 339/64 R

[56] References Cited

U.S. PATENT DOCUMENTS 3,982,806  9/1976  Wilson et al. .................... 339/64 R
4,111,511  9/1978  Bolin ............................... 339/64 R Primary Examiner—Laramie E. Askin
Attorney, Agent, or Firm—M. S. Yatsko

[57] ABSTRACT

A gas-insulated transmission line includes an outer sheath, an inner conductor, an insulating gas electrically insulating the inner conductor from the outer sheath, and insulating supports insulatably supporting the inner conductor within the outer sheath. The inner conductor is provided with flexibility by main conductor sections which are joined together through a conductor hub section and flexible flexing elements. Stress shields are provided to control the electric field at the locations of the conductor hub sections where the insulating supports are contacting the inner conductor. A plug and socket arrangement is utilized for joining adjacent sections of the inner conductor, and a protection tube is utilized inside the hollow plug to maintain proper alignment of the joint when the transmission line is bent.

4 Claims, 3 Drawing Figures

SEMI-FLEXIBLE GAS-INSULATED TRANSMISSION LINE USING PROTECTION TUBE IN CONDUCTOR PLUG-IN JOINT

GOVERNMENT RIGHTS STATEMENT

The Government has rights in this invention pursuant to Contract No. DE-AC-01-78-ET-29046 awarded by the U.S. Dept. of Energy.

CROSS-REFERENCE TO RELATED APPLICATIONS

Reference is made to the below-listed copending applications, both of which were originally assigned to the same original assignee as the present application:
1. Patent Application entitled "Semi-Flexible Gas-Insulated Transmission Line Using Electric Field Stress Shields", by A. H. Cookson, et al., Ser. No. 298,691, filed Sept. 2, 1981. 2. Patent Application entitled "Semi-Flexible Gas-Insulated Transmission Line Using Sandwiched Discs For Intermittent Flexing Joints" by P. R. Kommineni, Ser. No. 361,211, filed Mar. 24, 1982.

BACKGROUND OF THE INVENTION

This invention relates generally to gas-insulated electrical apparatus, and more particularly to a semi-flexible gas-insulated transmission line which utilizes a protection tube to control bending movements in the conductor plug-in joints.

Prior art gas-insulated transmission lines typically comprise a hollow, rigid elongated outer sheath at low or ground electrical potential, with a rigid inner conductor disposed within the outer sheath for carrying the electric current. Insulating supports are utilized for supporting the inner conductor within the outer sheath, and an insulating gas, typical of which is sulfur hexafluoride, is utilized for electrically insulating the high potential inner conductor from the grounded outer sheath.

One disadvantage which exists with the present gas-insulated transmission line is the inability of the lines to change direction easily. The present lines are composed of straight sections generally 30-60 feet in length, and changes in direction must be accomplished by fabricating a shorter line section and utilizing elbow sections, or the equivalent, to accomplish the change in direction. It therefore would be advantageous to manufacture and utilize a gas-insulated transmission line which can more readily accommodate changes in line direction.

SUMMARY OF THE INVENTION

In accordance with this invention, there is provided a gas-insulated transmission line which includes an elongated outer sheath with an elongated inner conductor disposed within said outer sheath. The inner conductor is comprised of longitudinally spaced apart cylindrical main conductor sections which have the same diameter and have ends facing one another. An element is fixedly secured to each main conductor section end, which element extends radially inwardly from the main conductor section end. A socket member is fixedly secured to one of the elements, and an adapter member is fixedly secured to the other element. A plug member is fixedly secured to the adapter member and extends outwardly therefrom into the socket member. The plug member and the socket member are in electrical contact, and a rigid protection tube is fixedly secured to the same element as the socket and extends outwardly therefrom into the hollow plug member. The protection tube has a plurality of circumferentially extending bearing strips secured about the outer surface of the tube, with the bearing strips contacting the inner surface of the plug member. An insulating gas is utilized for electrically insulating the inner conductor from the outer sheath, and means are provided for insulatably supporting the inner conductor within the outer sheath.

BRIEF DESCRIPTION OF THE DRAWINGS

Reference is now made to the description of the preferred embodiments, illustrated in the accompanying drawings, in which.

DESCRIPTION OF THE PREFERRED EMBODIMENT

Figure 1:
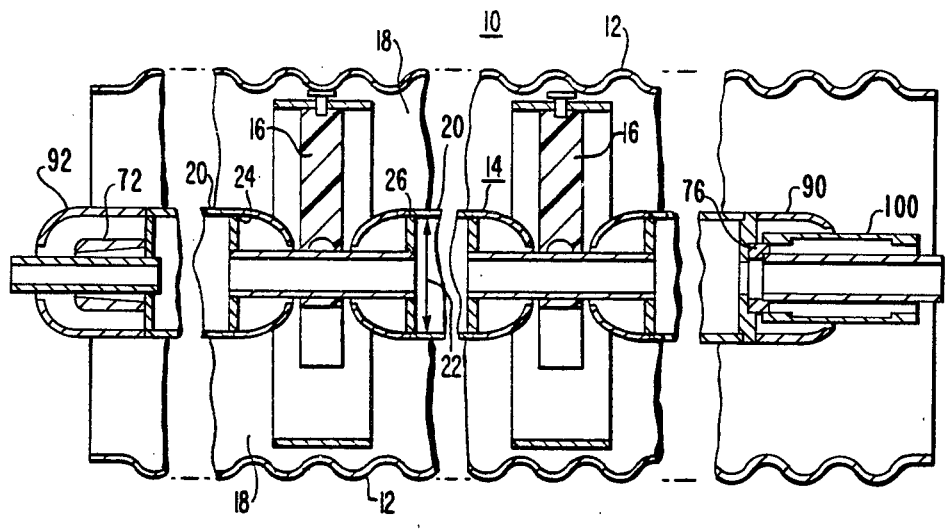
FIG. 1 is a view, in section, of a gas-insulated transmission line utilizing the teachings of this invention.

Referrring now more particularly to FIG. 1, therein is illustrated a compressed gas-insulated transmission line 10 illustrating the teachings of this invention. The transmission line 10 is comprised of an elongated outer sheath 12 which is corrugated to provide flexibility, and an elongated, generally cylindrical inner conductor 14 disposed within the outer sheath. A plurality of spaced insulating supports 16 are utilized for insulatably supporting the inner conductor 14 within the outer sheath 12, and an insulating gas 18, typical of which is sulfur hexafluoride at a pressure of 50 pounds/square inch gauge, is used for electrically insulating the inner conductor 14 from the outer sheath 12.

Figure 2:
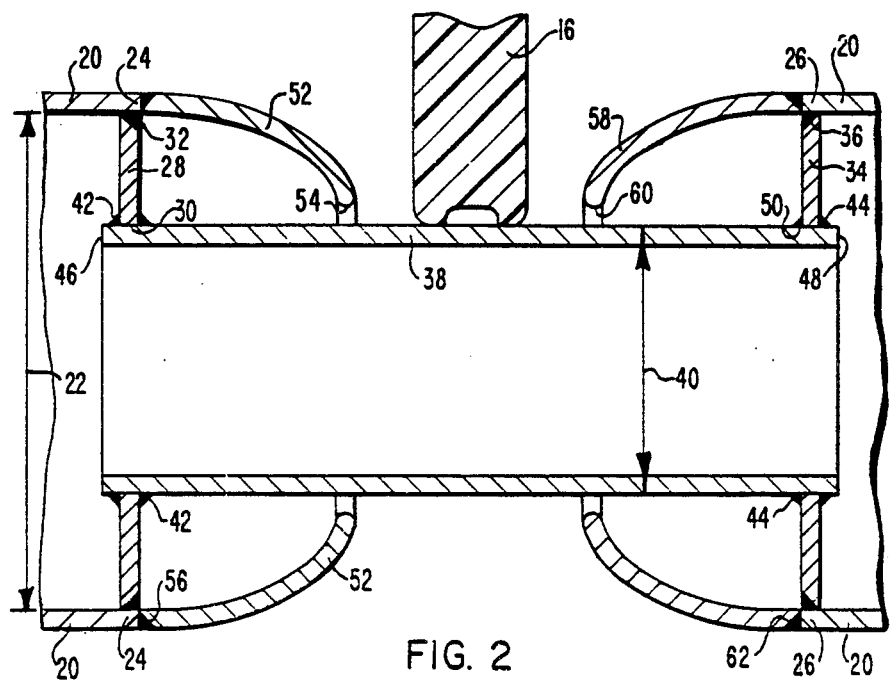
FIG. 2 is a detailed sectional view of the transmission line showing the connection of the stress shields.

The inner conductor 14 is comprised of longitudinally spaced-apart cylindrical main conductor sections 20 which each have the same inner diameter 22 and which have facing ends 24, 26 for example (see FIG. 2). A flexing element 28, illustrated in FIG. 2 as being a flat disc with an opening 30 therethrough, is fixedly secured, by means such as the weld 32, to the conductor end 24, and a similar flexing element 34 is fixedly secured by means such as the weld 36 to the conductor end 26. As shown, each flexing element 28, 34 extends radially inwardly from the main conductor section end 24, 26, respectively, to which it is secured.

A cylindrical conductor hub section 38, which has an outer diameter 40 less than the inner diameter 22 of the main conductor sections 20, is fixedly secured to the two flexing elements 28, 34 by means such as the welds 42, 44 adjacent the ends 46, 48 of the conductor hub section 38. By being so located, the conductor hub section 38 extends through the openings 30, 50 of the flat disc flexing elements 28, 34.

A curved stress shield 52 having an opening 54 formed therein is fixedly secured, by means such as the weld 56, to the conductor end 24, and a similar stress shield 58, with its opening 60, is secured by means such as the weld 62 to the conductor end 26. When assembled, the conductor hub section 38 extends through the stress shield openings 54, 60, although the stress shields 52, 58 are both spaced apart from the conductor hub section 38. The stress shields 52, 58 extend both longitudinally outwardly from, and radially inwardly from, the main conductor section ends 24, 26 to which they are respectively secured.

The inner conductor 14 (FIG. 1) is given a degree of flexibility so as to be permitted changes in angular alignment because of the presence of the flexing elements 28, 34. These flexing elements 28, 34, which pair of flexing elements may be positioned every 6 feet for a 50-foot bending radius, are current carrying members which transfer current from the main conductor sections 20 to the smaller diameter conductor hub section 38. The stress shields 52, 58 are utilized for controlling the electric field on the insulating support 16, and at the location where the insulating support 16 contacts the conductor hub section 38.

The conductors 14 of adjoining gas-insulated transmission line sections are assembled using a conductor plug-in joint. The plug-in joint utilizes a plug and socket assembly, with current transferring occurring between the plug and socket through spring-loaded contacts. It is imperative that the misalignment between plug and socket should be less than ±3° to maintain a uniform contact between the plug and the contact. For the prior, rigid gas-insulated transmission line sections, this tolerance is guaranteed during assembly. However, the new semi-flexible gas-insulated transmission line sections are bent in the field after assembly, and therefore the existing plug-in arrangement may not maintain the necessary uniform contact.

Figure 3:
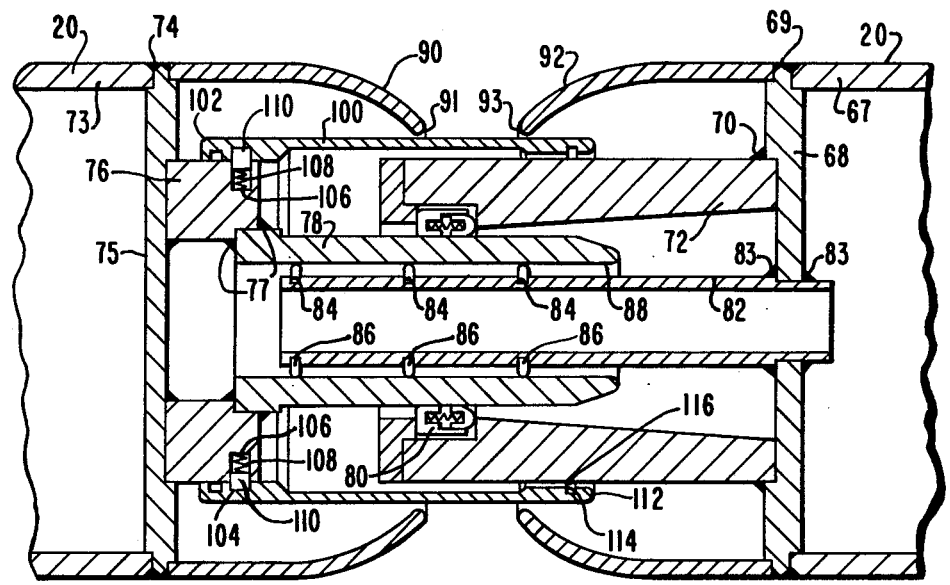
FIG. 3 is a detailed view, in section, of half of the plug-in joint.

To overcome this disadvantage, the plug-in joint illustrated in FIG. 3 is utilized for joining adjacent gas-insulated transmission line conductors 14. A first element 68, similar to the flexing element 28, is fixedly secured to the end 67 of the cylindrical main contact section 20 by means such as the weld 69. This element 68 extends radially inwardly from the conductor section 20, and has fixedly secured to it, by means such as the weld 70, a socket member 72. The socket member 72 extends longitudinally outwardly from the element 68, and has an outer diameter less than the inner diameter 22 of the main contact section 20.

Fixedly secured to the end 73 of an adjacent main conductor section 20, by means such as the weld 74, is a second element 75 which, like the first element 68, extends radially inwardly from the main conductor section 20. Fixedly secured to the second element 75 is an adapter member 76 which extends longitudinally outwardly from the second element 75. Fixedly secured to the adapter 76, by means such as the welds 77, is a hollow plug member 78. The hollow plug member 78 extends longitudinally outwardly from the adapter 76 into the interior of the socket member 72. Electrical contact between the socket member 72 and the hollow plug 78 is through a plurality of individual, spring-loaded contacts 80. A more detailed description of this electrical connection can be found in U.S. Pat. No. 4,111,511, which patent is hereby incorporated hereinto by reference. Suffice it to say, electrical current flow between the main conductor sections 20 occurs through the following path: from one main conductor section 20, through the first element 68, the socket member 72, the spring-loaded contacts 80, the plug 78, the adapter 76, the second element 75, and to the other main conductor section 20.

To insure that the plug-in joint remains straight during bending, a hollow, rigid protection tube 82 is fixedly secured to the first element 68 by means such as the welds 83. The protection tube 82 extends longitudinally outwardly from the first element 68 and extends inside the interior of the plug member 78. The protection tube 82 has a plurality of spaced-apart, circumferentially extending grooves 84 therein, and in each groove 84 is disposed a circumferentially extending bearing strip 86. The bearing strips 86 are made of an insulating material such as that sold under the trade name "Rulon J", and extend outwardly of the grooves 84 to contact the inside surface 88 of the plug member 78. These bearing strips 86 thus allow axial movement of the plug 78 and socket member 72, but will restrain any angular rotation of these two members, thus insuring a uniform contact between the plug member 78 and the socket contacts 80 at all times.

To provide electrical shielding of the plug-in joint, it may be desirable to utilize the stress shields 90, 92. The stress shields 90 would be fixedly secured to the main conductor section 73, and the stress shield 92 would be fixedly secured to the main conductor end section 67. As previously described with respect to the stress shields at the locations of the insulating spacers 16, the stress shield 90 has an opening 91 therein, and the stress shield 92 has an opening 93 therein, with the socket member 72 and the plug member 78 extending through the openings 91, 93 of the stress shields 90, 92 while being spaced apart therefrom.

Further shielding of the connection between the socket member 72 and the plug member 78 can be provided with the use of an annular, hollow, electrically conducting contact shield 100. The contact shield 100 has, at one end 102 thereof, a plurality of circumferentially spaced-apart cavities 104 which are aligned with corresponding cavities 106 in the adapter 76. Disposed within the adapter cavity 106 is a helical shield spring 108 which acts upon the adapter 76 and also upon a contact shield button 110 which extends into the contact shield cavity 104. As the plurality of buttons 110 are spaced around the periphery of the annular shield 100, these members function to physically retain the contact shield 100 in its position around, and connected to, the adapter 76.

The other end 112 of the contact shield 100 has an annular groove 114 therein, and disposed within this groove 114 is a wiper seal 116. The wiper seal 116 maintains the contact shield 100 in its location surrounding the socket member 72 while permitting sliding, axial movement of the socket member 72 relaive to the contact shield 100. Being thus connected, the contact shield 100 will maintain its position connected to the adapter 76 and the socket member 72 while compensating for the relative movement of the socket member 72 with respect to the plug member 78 and the adapter 76.

As can be seen, the invention described herein provides an improved gas-insulated transmission line which has a degree of flexibility both on the outer sheath and with the inner conductor, and which provides for proper alignment of the plug-in joints utilized for joining adjacent sections of the inner conductor.

I claim as my invention:
1. A gas-insulated transmission line comprising:
   an elongated outer sheath;
   a cylindrical first main conductor having a first diameter disposed within said outer sheath and having an end thereto;
   a first element fixedly secured to said first main conductor end and extending radially inwardly therefrom;
   a socket member fixedly secured to said first element and extending longitudinally outwardly therefrom, said socket member having a second diameter less than said first diameter;

a cylindrical second main conductor having said first diameter disposed within said outer sheath and having an end thereto spaced-apart from said first main conductor end;

a second element fixedly secured to said second main conductor end and extending radially inwardly therefrom;

an adapter member fixedly secured to said second element and extending longitudinally outwardly therefrom;

a hollow plug member fixedly secured to said adapter member and extending outwardly therefrom into said socket member, said plug member and said socket member being in electrical contact;

a rigid protection tube fixedly secured to said first element and extending outwardly therefrom into said plug member, said protection tube having a plurality of circumferentially extending bearing strips secured about the outer surface thereof, said bearing strips contacting the inner surface of said plug member;

an insulating gas electrically insulating said first and second main conductors from said outer sheath; and means for insulatably supporting said first and second main conductors in said outer sheath.

2. The transmission line according to claim 1 including:

a first curved stress shield having an opening therein fixedly secured to said first main conductor end; and a second curved stress shield having an opening therein fixedly secured to said second main conductor end, said socket member extending through said first and second stress shield openings while being spaced-apart from said first and second stress shields.

3. The transmission line according to claim 1 including a hollow contact shield carried by said adapter member and extending longitudinally outwardly therefrom in an overlapping relationship encircling said socket member, said contact shield carrying a seal therewith in sliding contact with the outer surface of said socket member.

4. The transmission line according to claim 1 wherein said protection tube has a plurality of spaced-apart circumferentially extending grooves therein, and said bearing strips are disposed in said grooves.

* * * * *